May 2, 1950   J. SZYDLOWSKI   2,506,248
AUTOMATIC CONTROL FOR SUPERCHARGERS
Filed Oct. 16, 1945   2 Sheets-Sheet 1

Inventor
J. Szydlowski
By Glascock Downing Seikle Attys.

May 2, 1950          J. SZYDLOWSKI          2,506,248
AUTOMATIC CONTROL FOR SUPERCHARGERS
Filed Oct. 16, 1945          2 Sheets-Sheet 2
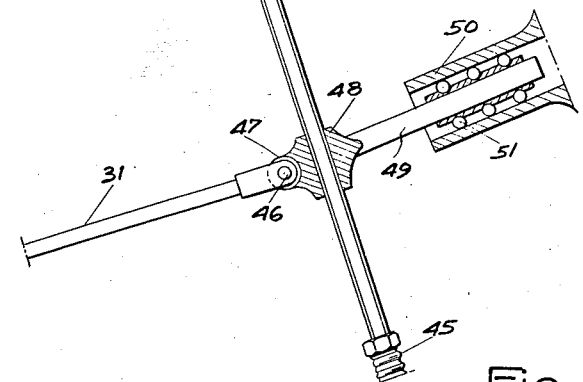
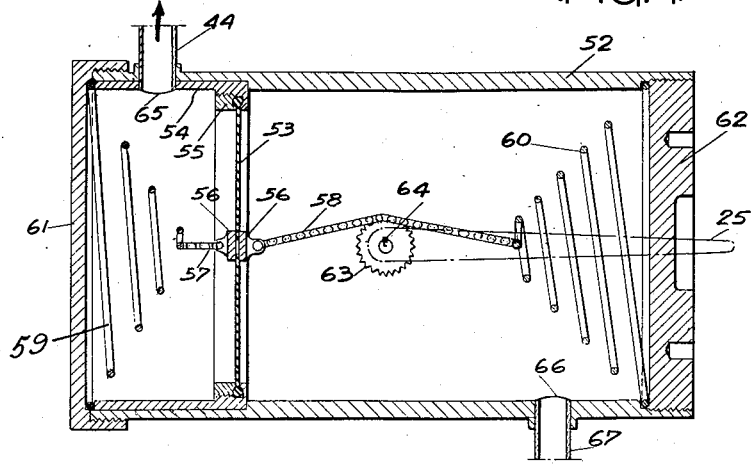
Inventor
J. Szydlowski Patented May 2, 1950

2,506,248

UNITED STATES PATENT OFFICE 2,506,248

AUTOMATIC CONTROL FOR SUPERCHARGERS

Josef Szydlowski, Bordes, France

Application October 16, 1945, Serial No. 622,587
In France November 3, 1944

7 Claims. (Cl. 123—119)

The invention relates to internal combustion engines, fed by a supercharger, in all applications wherein the opposing torque is variable within very wide limits and especially in automobiles.

It is known that the power output by an internal combustion engine increases with the rotation speed up to the normal service speed, whereas the curve indicating variations in the engine torque in relation to the speed passes through a maximum for a speed smaller than said normal service speed. From this remark, two important consequences may be inferred:

(a) When the opposing torque increases while the engine is at its normal service speed, without however exceeding the maximum value of the engine torque, the speed of rotation of the engine diminishes until it reaches a value for which the engine torque balances the opposing torque. The engine then operates at reduced power. This drawback makes itself particularly felt in the case of transportations which most frequently should be effected in a minimum time.

(b) When the opposing torque increases beyond the maximum value of the engine torque, no balance may of course occur, and the engine stops after a more or less great period of time.

Accordingly, it has been previously suggested to transmit power output by means of a torque transformer actuated by hand or automatically. This transformer allows maintaining the engine normal service speed and consequently its horsepower, when proportioning in relation to the opposing torque, the reduction ratio of the torque transformer incorrectly called gear control. However automatic devices of this type have not been entirely satisfactory and, at any rate, they have not been adopted in current practice, although various types thereof have already been suggested. Hand operated systems generally offer only a very reduced range of reduction ratios, and even assuming this range to be very wide, their constant manipulation is a practical impossibility.

The invention has for its object or commercial result to avoid the use of any torque transformer, at least between the maximum horsepower normal speed, and a lower limiting rotation speed, spaced from the preceeding speed by a more or less important interval. To obtain this result, the invention aims to modify the form of the curve characterizing the horsepower for various R. P. M., by causing said horsepower to be constant or at least substantially constant between the above mentioned limits.

For this purpose, the improvement according to the invention, relates to a supercharger for feeding the engine in the known way, but provided with means for regulating the supercharging pressure, said means being so designed and arranged that, between said speed limits, said supercharging pressure will vary in reverse relationship with the speed.

The engine torque being dependent on the supercharging pressure, it will be understood that, within the indicated limits of speed, the engine torque increases when the speed diminishes and vice versa in such a way that the horsepower remains substantially the same. Consequently, within such limits, it is no longer necessary to use a torque transformer.

Of course, the means employed for controlling the supercharging pressure may be of any character, and may particularly comprise any one of the following arrangements:

A contraction either in the inlet or in the delivery of the supercharger, said contraction having a variable section in reverse relationship with the speed. But this means offers the drawback of uselessly absorbing superfluous horsepower, thereof reducing the overall efficiency of the engine, and moreover generating a temperature which inasmuch as it reduces the specific gravity of the air drawn in, causes a reduction in the engine power.

Adjustable shutter devices disposed either before the rotor of the supercharger or between two sets of vanes of said rotor.

In such adjustable shutter devices, the rotor may be constituted of several elements coupled between each other and connected to the shaft in such a way that some at least of these elements may, for a certain rotation speed of the shaft, rotate at a different speed in relation to the angular position of the adjustable shutters.

A supercharger driven by an hydraulic power transmission such as that used in certain aircraft engines.

The regulation means used to vary the supercharging pressure in reverse relationship to the engine rotation speed may of course be actuated by hand. However, it is preferable that it may be automatically actuated. To this end, according to a device, the embodiment of which is comprised within the scope of the invention, the control of such adjusting means may for example be effected, especially when such means are constituted by angularly adjustable shutters, through a servo-motor, the working of which is dependent on the flow of air sucked up by the supercharger through a contraction device, such as a Venturi tube, whereby said servo-motor will tend to maintain constant the air weight passing through said Venturi tube during the unit of time.

A further development of the invention has for object or particular commercial result to maintain constant the engine output whatever the variations of circumambient air conditions may be, and chiefly the variations of its temperature and its pressure. To this end, an air suction intake actuating the servo-motor and which is situated before the Venturi-tube contraction, is movable in accordance with the circumambient air pressure (for example under the action of a barometric capsule), while another air suction intake actuating the servo-motor and located after said restriction, is movable in accordance with the temperature (for example under the action of a thermostat).

In such conditions, when the engine operates at full suction (i. e. when the induction control means of the engine is completely open) the engine output remains constant, whatever the variations in the circumambient air conditions may be. This advantage is particularly important for vehicles used in mountainous country, where the altitude may vary considerably in the course of a single journey as may also the temperature.

Lastly, a third development of the invention, as disclosed above, has for object to automatically introduce a torque transformer into the power transmission when the speed limits previously indicated are reached. To this effect, the invention is characterized in that the gear control is automatically effected when the super charging pressure regulating means reaches one or the other of its extreme positions. For example, the shutters may be made to control an electric switch associated with an electro magnetic transmission, so as to pass from one reduction ratio to the other according to the position of said shutters.

The accompanying drawing represents by way of example only and in schematical form an embodiment of the invention:

Fig. 1 is an explanatory diagram showing curves indicating variations in engine torque and power output at various R. P. M.;

Fig. 3 is a sectional longitudinal view of an air suction intake used in the installation illustrated in Fig. 2;

Fig. 4 is a sectional longitudinal view of the servo-motor used in the installation illustrated in Fig. 2.

Figure 1:
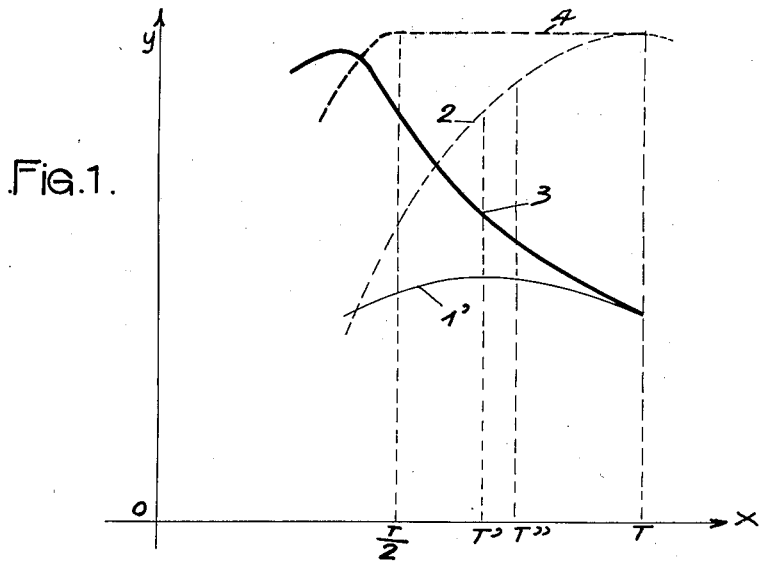

In Fig. 1 there has been shown a system of coordinates $x$—$o$—$y$, wherein the abscissas represent revolutions per minute while the ordinates represent:

1. The engine torque for an ordinary engine, according to curve 1 in thin continuous lines;
2. The power output for the same engine, according to curve 2 in thin dotted lines;
3. The engine torque for an improved engine according to the invention, as illustrated by curve 3 in thick continuous lines;
4. The power output for the same engine, according to curve 4 in thick dotted lines.

The power output is the product of the engine torque by the number of revolutions per second. In an internal combustion engine of conventional type, the torque curve 1 corresponds to a power output curve 2. This curve 2 has a maximum for a R. P. M. number T corresponding to the normal service speed of the engine at maximum power, while the torque curve 1 has a maximum for a smaller R. P. M. number T'. It will thus be understood that the engine being assumed to operate at the speed T, if the opposing torque increases though however not exceeding the engine torque maximum value, the speed will diminish down to the value T'' for which the engine torque balances the opposing torque, but the engine then no longer operates at full power output.

As disclosed, the object of the invention is to endow the engine torque curve with such a shape that the corresponding power output curve will be as nearly as possible a line parallel to the axis of abscissas between two speed limits such as T and, for example T/2. If the power output curve is exactly a line parallel to said axis within those limits, the torque curve will then, within the same limits, be a portion of an equilateral hyperbola, as will be readily understood; the engine torque Cm may be expressed in the algebraic form:

$$Cm = \frac{P}{n}$$

with P being the constant power and $n$ the R. P. M. number.

Figure 2:
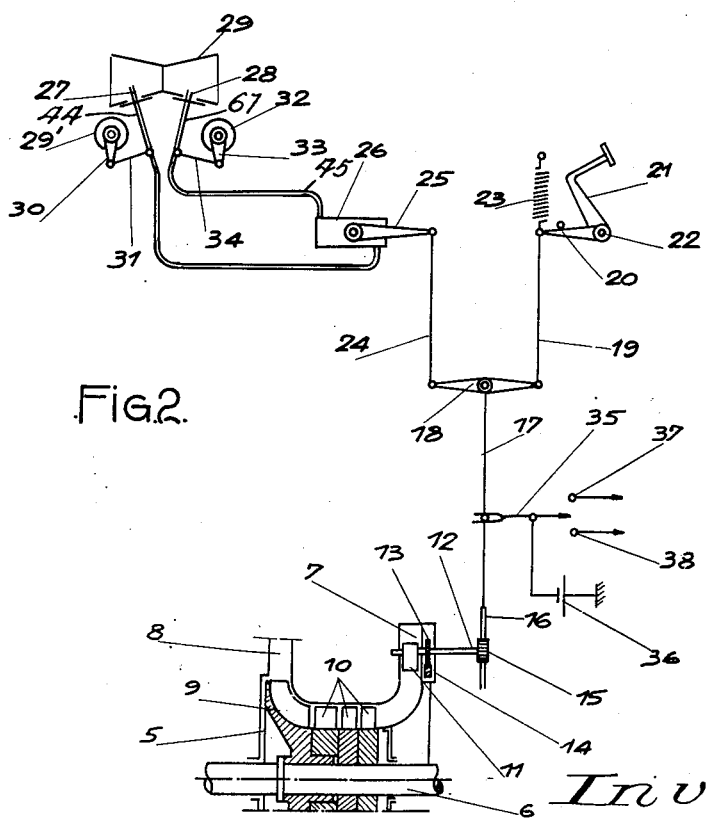
Fig. 2 is a diagrammatic view of the installation, according to the invention.

The device diagrammatically shown in Fig. 2 enables such conditions to be fulfilled. It comprises, combined with an internal combustion engine, not represented, a supercharger 5, the rotor of which is keyed on the shaft 6; that supercharger sucks up air through the inlet 7 and discharges through the outlet 8. It may be of any known type and may in particular comprise a rotor having a rotative part 9 acting mainly by centrifugal force and in a radial direction, which is provided with separate vanes 10 for guiding the air flow. According to the invention, that supercharger is provided with angularly adjustable shutters such as 11 disposed within the inlet 7.

These shutters are actuated by a shaft 12, which, by means of a pinion 13, engaging a toothed wheel rim 14, simultaneously controls all the adjustable shutters. The shaft 12 carries for example at one of its ends, a driving pinion 15, actuated by a rack 16, suitably guided and controlled by means of a rod 17 connected to an equalizing lever 18. One of the ends of said lever 18 is hinged to a rod 19 connecting it to a lever 20, journaled in relation to the accelerator pedal 21 upon a pin 22 against a release spring 23. The opposite end of the equalizing lever 18 is connected through a rod 24 to a lever 25 actuated by a servomotor 26. The latter is in turn controlled by two air suction intakes 27 and 28 located respectively on the inlet side and on the outlet side of the contracted section of a Venturi tube 29 through which flows the air sucked by the supercharger. Said suction intakes are connected to the servomotor by movable intake conducts 44 and 67.

Each air suction intake comprises a longitudinal slot 39 provided through the wall of the Venturi tube 29, a resilient membrane 40, fitted to the outwardly directed edge 41 of said slot by a beading 42 and carrying two brackets 43 clamped on it and through which pass an intake conduct 44. Said intake conduct projects inwardly of said Venturi tube and connects said tube to the servomotor 26 by means or a flexible pipe 45. An actuating link 34 causes translation movement of the conduct 44 parallel to the corresponding wall of the Venturi tube, the tightening of said wall being maintained by means of the resilient deformation of the membrane 40. One end of the actuating link 31 or 34 is journaled upon a pin 46 fitted on a yoke 47 provided in a support 48 clamped on the conduct 44. Said support 48 comprises a projecting stem 49 adapted to slide through a bearing 50 provided with ball translating device 51. The other ends of the actuating links 31 and 34 are respectively connected to levers 30 and 33 respectively actuated by means of a barometric capsule 29' and a thermostat of any known type 32.

The servomotor 26 comprises a cylinder 52 within which is clamped a resilient membrane 53 by means of an abutting auxiliary cylinder 54 and a nut 55. Said membrane 52 carries two central brackets 56 clamped on it and supporting roller chains 57 and 58. Said roller chains are stretched by means of volute release springs 59 and 60 clamped between the cylinder 52 and covers 61 and 62. The roller chain 58 engaged a chain wheel 63 keyed on a shaft 64 crossing the cylinder 52 and on which is fitted the lever 25. The resilient membrane 53 divides the internal cylinder volume into two chambers connected respectively by discharge ports 65 and 66 and intake conducts 44 and 67 with the air suction intakes 27 and 28. The deformation of the resilient membrane 53 within the cylinder 52 depends on the suction difference between the two air suction intakes 27 and 28, whereby involving the rotation of the chain wheel 63 by means of the roller chain 58 and consequently the pivoting of the lever 25 round the shaft 64. Lastly, a switch 35 is controlled by the rod 17 so as to connect the battery 36 respectively with one of the contact plates 37 or 38 when the shutters 11 are in one or the other of their extreme position. Those contact plates control insertion in the power transmission of a torque transformer driving either a reducing or a multiplying gear to be interposed between the engine and the driven shaft. Direct coupling is effected in other cases.

The device operates as follows:

When the engine is in service and the accelerator pedal 21 is completely pushed down, the position of shutters 11 obviously depends on the servo-motor 26. Now, the latter is designed so as to maintain within the Venturi tube 29 a flow of a constant air weight per unit of time. When the speed of rotation of the engine is reduced, the weight of air flowing per unit of time through the Venturi tube also tends to diminish, involving a decreasing of the suction difference between the two air suction intakes 27 and 28. Consequently the servo-motor 26 actuates the shutters 11 to cause a motion of said shutters involving an increase of the supercharging pressure so as to restore the flow of a normal air weight per unit of time, through the Venturi tube. This increase in supercharging pressure has obviously for effect to produce a concomitant increase in the engine torque whereby the curve 3 is obtained. The same result could be obtained by using, in order to displace the shutters 11 and consequently to control the rod 24, a servo-motor which would be actuated by a revolution counter. But, the above described arrangement is much more advantageous and it is allowed to effect easily altitude and temperature corrections by means of the barometric capsule 29 and the thermostat 32 as follows: When the atmospheric pressure increases the volumetric air density increases also, causing a flow of a greater air weight per unit of time, therefore involving a decreasing of the suction difference between the two air suction intakes 27 and 28. Then the barometric capsule 29' displaces by means of the lever 30 and the link 31 the air suction intake 27 towards the contracted section of the Venturi tube 29. Thus the conduct 44 is placed in a section of said Venturi tube the suction of which displaces the servo-motor membrane 53 to the left side, so as to cause a motion of shutters involving a decreasing of the supercharging pressure, whereby the flow of a normal air weight per unit of time is restored. When the atmospheric pressure decreases, the action of the barometric capsule 29' causes a removal of the air suction intake 27 from the contracted section of the Venturi tube.

The actions of the thermostat 32 are respectively the same for an increasing and a decreasing of the atmospheric temperature.

Consequently, between the limits of speed T and T/2 (in the illustrated example) the engine power output remains constant at all times and the driver of the car does not need to make use of the gear control. In the event where those limits should be attained, the switch 25 automatically puts into action a reduction gear (if the speed becomes less than T/2) or a multiplication gear (if the speed becomes greater than T), so as to bring back working conditions into the above stated constant horsepower range. The torque transformer used may advantageously be of the electro-magnetic type; but it could of course be of any other suitable type.

The invention could be applied to a specially designed supercharger provided in an aircraft to supply a sealed cabin with air when the aircraft is flying at high altitudes.

What I claim as my invention and desire to secure by Letters Patent is:

1. An automatic control for a supercharger feeding an internal combustion engine comprising an inlet manifold for air feeding said supercharger provided with inlet ports, adjustable shutters located within said inlet manifold for adjusting the section of said inlet ports, a shaft for actuating said shutters, a pinion keyed on said shaft, a rack adapted to engage said pinion, an equalizing lever for translating said rack, a rod for connecting one end of said equalizing lever to the accelerator pedal of said engine, a servomotor, a lever adapted to be actuated by said servo-motor, a rod for connecting said lever to the other end of said equalizing lever, and actuating means adapted to be actuated by the air sucked by said supercharger and to operate said servomotor so as to maintain constant per unit of time the air weight delivered through said manifold.

2. An automatic control for a supercharger airfeeding an internal combustion engine, according to claim 1, wherein the actuating means adapted to be actuated by the air sucked by said supercharger and to operate the servo-motor so as to maintain constant per unit of time the air weight delivered through the inlet manifold of said supercharger comprises means for increasing the supercharging pressure when the engine speed is reduced and inversely, means for increasing the supercharging pressure when the atmospheric pressure decreases and inversely, means for increasing the supercharging pressure when the air temperature increases and inversely.

3. An automatic control for a supercharger airfeeding an internal combustion engine, according to claim 1, wherein the actuating means adapted to operate the servo-motor so as to maintain constant per unit of time the air weight delivered through the inlet manifold of said supercharger comprises a Venturi tube adapted to be inserted in the air circuit beyond said manifold, and connecting means adapted to be actuated by the air sucked by said supercharger and to transmit to said servo-motor the difference of suctions exerting on each side of the contracted section of said Venturi tube.

4. In combination, an internal combustion engine, a supercharger for supplying air thereto, adjustable means for adjusting said air supply, means for controlling said adjustable means and actuating means adapted to be actuated by the air sucked by said supercharger and to operate said controlling means so as to maintain constant per unit of time the air weight delivered to said supercharger.

5. In combination, an internal combustion engine, a supercharger for supplying air thereto, an inlet manifold provided with inlet ports for air feeding said supercharger, adjustable shutters located within said inlet manifold for adjusting the section of said inlet ports, means for controlling said shutters and actuating means adapted to be actuated by the air sucked by said supercharger and to operate said controlling means so as to maintain constant per unit of time the air weight delivered through said manifold.

6. An automatic control for a supercharger air-feeding an internal combustion engine, according to claim 1, wherein the actuating means adapted to operate the servo-motor so as to maintain constant per unit of time the air weight delivered through the inlet manifold of said supercharger comprises a Venturi tube adapted to be inserted in the air circuit beyond said manifold, two air suction intakes located on each side of the contracted section of the Venturi tube, each having a movable suction conduct projecting inwardly said tube and adapted to connect the inner part of said tube of the servo-motor, means for maintaining the tightening of the wall of said tube round said conduct, and operating means adapted to be actuated by the air sucked by said supercharger and to move said suction conduct parallel to the corresponding wall of said tube in relation to the circumambient air conditions.

7. An automatic control for a supercharger air-feeding an internal combustion engine, according to claim 1, wherein the actuating means adapted to operate the servo-motor so as to maintain constant per unit of time the air weight delivered through the inlet manifold of said supercharger comprises a Venturi tube adapted to be inserted in the air circuit beyond said manifold, two air suction intakes located on each side of the contracted section of the Venturi tube, each having a movable suction conduct projecting inwardly said tube and adapted to connect the inner part of said tube of the servo-motor, means for maintaining the tightening of the wall of said tube round said conduct, and operating means adapted to be actuated by the air sucked by said supercharger and to move said suction conduct parallel to the corresponding wall of said tube in relation to the circumambient air conditions, comprising a barometric capsule, a lever adapted to be actuated by said capsule, a link for transmitting the movement of said lever to the suction conduct located within the Venturi-tube beyond its contracted section, a thermostat, a lever adapted to pivot under the action of said thermostat and a link for transmitting the movement of said last lever to the suction conduct located within the Venturi tube after said contracted section.

JOSEF SZYDLOWSKI.

REFERENCES CITED

The following references are of record in the file of this patent:

UNITED STATES PATENTS

| Number | Name | Date |
|---|---|---|
| 2,214,100 | Claytor | Sept. 10, 1940 |
| 2,216,699 | Berger | Oct. 1, 1940 |
| 2,217,364 | Halford et al. | Oct. 8, 1940 |
| 2,281,916 | Claytor | May 5, 1942 |
| 2,310,984 | Mock et al. | Feb. 16, 1943 |
| 2,311,936 | Elfes et al. | Feb. 23, 1943 |
| 2,356,379 | Caris et al. | Aug. 22, 1944 |
| 2,374,305 | Paton | Apr. 24, 1945 |
| 2,374,708 | Shoults | May 1, 1945 |
| 2,376,199 | Shoults | May 15, 1945 |
| 2,378,441 | Silvester | June 19, 1945 |